United States Patent Office 2,730,547
Patented Jan. 10, 1956

2,730,547
BENZYLTRIS (DIALKYLAMINO) PHOSPHONIUM HALIDES

William T. Dye, Jr., Decatur, Ala., assignor to Monsanto Chemical Company, St. Louis, Mo., a corporation of Delaware No Drawing. Application February 1, 1955,
Serial No. 485,585

4 Claims. (Cl. 260—551)

The present invention relates to nitrogenous organic compounds of phosphorus, and more particularly provides useful new nitrogenous phosphonium halides, and biological toxicant compositions containing the same.

According to the invention there are provided benzyltris(dialkylamino)phosphonium halides having the general formula

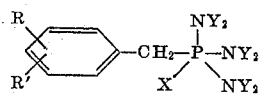

in which R and R' are selected from the class consisting of hydrogen, chlorine, bromine and alkyl radicals of from 1 to 18 carbon atoms, Y is selected from the class consisting of alkyl radicals of from 1 to 4 carbon atoms and X is selected from the class consisting of bromine and chlorine.

Compounds having the above general formula are readily obtained by contacting a hexaalkylphosphorous triamide in which the alkyl radical has from 1 to 4 carbon atoms with a benzyl halide selected from the class consisting of benzyl chloride and benzyl bromide and the nuclear chloro-, bromo-, dichloro-, dibromo-, chlorobromo-, alkyl-, dialkyl-, chloroalkyl-, or bromoalkyl-derivatives of such benzyl halides, substantially according to the scheme:

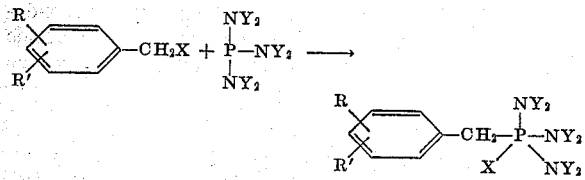

in which R, R', Y and X are as defined above.

Benzyl halides useful for the present purpose include, e. g., benzyl chloride, benzyl bromide, 2-, 3- or 4-chlorobenzyl chloride, 2-, 3- or 4-bromobenzyl chloride, 2-, 3- or 4-chlorobenzyl bromide, 2-, 3- or 4-bromobenzyl bromide, 2,3-dichlorobenzyl chloride, 3,5-dibromobenzyl chloride, 3,4-dichlorobenzyl bromide, 2,4-dibromobenzyl bromide, 2-chloro-3-bromobenzyl chloride, 2-chloro-5-bromobenzyl bromide, 2-, 3-, or 4-ethylbenzyl bromide, 2-methyl-4-chlorobenzyl chloride, 3,3-diamylbenzyl chloride, 2-, 3-, or 4-amylbenzyl chloride, 4-hexylbenzyl chloride, 2-heptylbenzyl chloride, 4-(2-ethylhexyl)benzyl chloride, 3-n-octylbenzyl bromide, a nonylbenzyl chloride in which the nonyl radical is derived from propylene trimer, 2-n-decylbenzyl chloride, 2-, 3-, or 4-dodecyl-benzyl chloride, 4-dodecyl-2-methylbenzyl bromide, x-tetradecylbenzyl chloride, a tridecylbenzyl chloride in which the tridecyl radical is derived by chlorination of an alcohol obtained according to the "oxo" process by the pressure reaction of carbon monoxide and hydrogen with a higher olefin, x-hexadecylbenzyl chloride, 2-, 3-, or 4-n-octadecylbenzyl chloride, etc.

Hexaalkylphosphorous triamides which may be reacted with the benzyl halides to yield the present benzyltris-(dialkylamino)phosphonium halides include, e. g., hexamethylphosphorous triamide, hexaethylphosphorous triamide, hexa-n-propylphosphorous triamide, hexaisopropylphosphorous triamide, hexa-n-butylphosphorous triamide, etc.

As illustrative of benzyltris(dialkylamino)phosphonium halides provided by the invention may be mentioned, e. g., benzyltris(dimethylamino)phosphonium chloride or bromide, benzyltris(diethylamino)phosphonium chloride or bromide, benzyltris(di-n-butylamino)-phosphonium chloride or bromide, 2-chlorobenzyltris-(diisopropylamino) phosphonium chloride or bromide, 3-bromobenzyltris(diethylamino)phosphonium chloride or bromide, 4-chlorobenzyltris(dimethylamino)phosphonium chloride or bromide, 2,3-dichlorobenzyltris(dimethylamino)phosphonium chloride or bromide, 3,4-dibromobenzyltris(di-n-propylamino)phosphonium chloride or bromide, 2-chloro-4-bromobenzyltris(dimethylamino)phosphonium chloride or bromide, 4-ethylbenzyltris(diethylamino)phosphonium chloride or bromide, 2-methyl-4-chlorobenzyltris(di-n-butylamino)phosphonium chloride or bromide, 2,3-diamylbenzyltris(dimethylamino)phosphonium chloride or bromide, 2-, 3-, or 4-amylbenzyltris(dimethylamino)phosphonium chloride or bromide, 3-(2-ethylhexyl)benzyltris(dimethylamino)phosphonium chloride or bromide, 4-n-nonyl-benzyltris(dimethylamino)phosphonium chloride or bromide, 2-, 3-, or 4-decylbenzyltris(dimethylamino)phosphonium chloride or bromide, 4-undecylbenzyltris(dimethylamino)phosphonium chloride or bromide, 2-, 3-, or 4-tert-dodecyl- or n-dodecylbenzyltris(dimethylamino)-phosphonium chloride or bromide, 2-, 3-, or 4-tetradecyl-benzyltris(dimethylamino)phosphonium chloride or bromide, 2-, 3-, or 4-octadecylbenzyltris(dimethylamino)-phosphonium chloride or bromide, etc.

Reaction of the benzyl halide compound with the hexaalkylphosphorous triamide to yield the present phosphonium halides is effected by simply mixing the two reactants in the presence or absence of an inert solvent or diluent at ordinary or increased temperature, depending upon the nature of the individual reactant. While reaction of the triamides with the benzyl halides occurs in the presence or absence of a diluent, it is often advantageous to use an inert solvent or diluent. The use of such an inert extraneous material serves to effect smooth reaction and to facilitate separation of the crystalline phosphonium halides. Although any inert liquid material may be used for this purpose, I prefer to employ as diluent a liquid which is not only inert under the reaction conditions, but which is also a solvent for one or, preferably, both reactants and a comparative non-solvent for the phosphonium halide. Dioxane is admirably suited to this purpose. The phosphonium halides are well-defined high-melting crystalline compounds. Most of the present compounds are stable under ordinary atmospheric conditions; some of them, however, have a tendency to deliquesce under moist or humid conditions. Their deliquescence decreases with increasing purity. They are generally soluble in water, hot dioxane, chloroform, and ethanol, but insoluble in ether, hexane and benzene.

The present benzyl phosphonium halides are valuable for a variety of industrial and agricultural purposes. They are generally good biological toxicants, being useful as herbicides, fungicides, insecticides and nematocides. The biological toxicant efficiency of the present compounds is demonstrated when they are employed in very low concentrations. Since they are generally water-soluble no expensive or obnoxious carriers need be employed in the formulation of herbicidal, fungicidal or insecticidal compositions containing the present compounds as the active ingredients. Being crystalline solids, the present compounds may be also incorporated into powders such as pumice, clay, bentonite, etc., in the formulation of toxicant dusts.

This invention is further illustrated, but not limited, by the following examples:

Example 1

A mixture consisting of 40.7 g. hexamethylphosphorous triamide, 31.6 g. freshly distilled benzyl chloride and 150 cc. sodium-dried dioxane was refluxed, with stirring, for 2.5 hours. The reaction mixture was then cooled, diluted to 500 cc. with dioxane, and filtered. The precipitate was washed with dioxane, dissolved in chloroform and reprecipitated with hot dioxane to yield 33 g. of white platelets of the substantially pure benzyltris(dimethylamino)phosphonium chloride, melting sharply at 209–10° C., and analyzing as follows:

|  | Found | Calcd. for $C_{13}H_{25}N_3PCl$ |
|---|---|---|
| Percent Cl | 11.87 | 12.23 |
| Percent N | 14.63 | 14.51 |

Example 2

A mixture consisting of 25.8 g. 2-chlorobenzyl chloride and 25.4 g. hexamethylphosphorous triamide dissolved in 200 cc. ether was allowed to stand for 3 weeks at ordinary room temperature. The needles were filtered off, rinsed with dioxane, then dissolved in chloroform and reprecipitated from hot dioxane. The resulting slurry of fine crystals was then filtered, rinsed with dioxane and dried. There was thus obtained 12.3 g. of the substantially pure 2-chlorobenzyltris(dimethylamino)phosphonium chloride, M. P. 234–5.5° C. and analyzing as follows:

|  | Found | Calcd. for $C_{13}H_{24}N_3PCl_2$ |
|---|---|---|
| Percent Ionic chlorine | 11.28 | 10.93 |
| Percent total chlorine | 21.02 | 21.87 |
| Percent N | 12.99 | 12.96 |

Example 3

A mixture consisting of 40.7 g. hexamethylphosphorous triamide, 40.3 g. 2-chlorobenzyl chloride and 200 cc. dry dioxane was refluxed, with stirring, for 7 hours. 200 cc. dioxane was then added to the reaction mixture and the whole was allowed to stand overnight. The white prisms were filtered, dissolved in hot chloroform, precipitated with dioxane, and dried, yielding 60 g. (74% of theoretical yield) of 2-chlorobenzyltris(dimethylamino)phosphonium chloride, M. P. 233.5° C.

Example 4

24.7 g. hexaethylphosphorous triamide, 29.2 g. 3,4-dichlorobenzyl chloride and 100 cc. sodium dried dioxane were mixed and heated to gentle reflux. After refluxing for five hours without precipitation, the mixture was allowed to stand overnight, during which time elongated platelets precipitated. These were filtered and washed, first with dioxane and then with ether; M. P. 140–160° C. Two repeated recrystallizations from dioxane and ether gave 22.5 g. crude 3,4-dichlorobenzyltris(diethylamino)phosphonium chloride, M. P. 145–160° C.

Example 5

A mixture consisting of 40.7 g. hexamethylphosphorous triamide, 40.3 g. freshly distilled 4-chlorobenzyl chloride and 100 cc. dry dioxane was refluxed for 3 hours, then diluted to 400 cc. with dioxane and allowed to cool. The crystals were filtered off and recrystallized twice from chloroform and dioxane, yielding 46 g. of the substantially pure 4-chlorobenzyltris(dimethylamino)phosphonium chloride, M. P. 211–2° C.

Example 6

31.4 g. 2,4-dichlorobenzyl chloride was mixed with 25.4 g. hexamethylphosphorous triamide and 200 cc. ether. After standing for three weeks the mixture was filtered, rinsed with dioxane and ether, and dried, giving the substantially pure 2,4-dichlorobenzyltris(dimethylamino)phosphonium chloride as fine white needles, M. P. 203–9° C.

Example 7

31.4 g. 3,4-dichlorobenzyl chloride was mixed with 25.4 g. hexamethylphosphorous triamide in a dropping funnel; and the mixture was introduced, dropwise, into a flask which was immersed in a bath held at a temperature of 120° C. The mixture in the funnel began to precipitate even before all of it had been introduced into the flask. After all of the mixture had been added, the contents of the flask were heated for 15 minutes at 120° C., then cooled to 100° C. and diluted with 50 cc. dioxane. The whole was then cooled and further diluted with ether. Filtration gave 40 g. of a light tan product, M. P. 190–230° C. This was recrystallized from hot chloroform and dioxane to yield 30 g. of pure white prisms of 3,4-dichlorobenzyltris(dimethylamino)phosphonium chloride, M. P. 240–42° C., analyzing as follows:

|  | Found | Calcd. for $C_{13}H_{23}N_3PCl_3$ |
|---|---|---|
| Percent Ionic chlorine | 9.56 | 9.89 |
| Percent N | 11.67 | 11.71 |

Example 8

Into a 250 ml. flask there were placed 98.3 g. (0.33 mole) of x-dodecylbenzyl chloride and 54.3 g. (0.33 mole) of hexamethylphosphorous triamide. The mixture was swept with nitrogen and heated with stirring to 100–120° C., whereupon the reaction became exothermic so that a temperature of about 170° C. was obtained. External cooling was used to reduce the temperature of the reaction mixture to 135–140° C., and heating with stirring at this temperature was continued for an additional hour. The resulting reaction mixture, partly crystalline and semi-solid, comprised the substantially pure x-dodecylbenzyltris(dimethylamino)phosphonium chloride analyzing 7.81% ionic chlorine, as against 7.75%, the calculated value.

Example 9

A mixture consisting of 61.8 g. (0.2 mole) of x-dodecyl-x-methylbenzyl chloride and 32.6 g. (0.2 mole) of hexamethylphosphorous triamide was heated with stirring to a temperature of 120° C., external cooling was applied and heating was continued to a temperature of 135–140° C. for an additional hour. At the end of this time cooling was discontinued and the reaction mixture was heated at 150–155° C. for an additional two hours. The resulting reaction comprised the substantially pure x-dodecyl-x-methylbenzyl-tris(dimethylamino)phosphonium chloride, a semi-fluid material, which analyzed as follows:

|  | Found | Calcd. for $C_{26}H_{51}ClN_3P$ |
|---|---|---|
| Percent C | 64.86 | 64.75 |
| Percent H | 11.10 | 10.89 |
| Percent N | 8.77 | 8.90 |
| Percent Cl | 7.25 | 7.53 |

Example 10

This example describes evaluation of the x-dodecylbenzyl phosphonium chloride of Example 8 as a nematocide, employing an aqueous nematode culture. It is known that a nematode, when placed in water, flexes its body at a more or less constant rate and that the effect of a nematocide can be estimated with reasonable accuracy by counting the rate of these flexures.

The chloride was dissolved in a small quantity of acetone and the resulting solution and an emulsifying agent (a polyalkyleneglycol-alkylbenzenesulfonate emulsifier known to the trade as "Tween 20") were added to water to make up a 2 per cent concentration of the chloride. The emulsifier was present in a concentration of less than about 1.0 per cent. The resulting emulsion was then diluted with water to give an 0.2 per cent concentration of the chloride.

Live nematodes (*Panagrellus redivivis*) were collected from the stems of a Baermann funnel and 2.5 mls. of an aqueous suspension containing about 250 of these nematodes were placed in each of two Stender dishes. To one Stender dish was added 2.5 mls. of the 0.2 per cent emulsion of the chloride. This corresponded to an 0.1 per cent concentration of the chloride in the dish of nematodes. The other Stender dish was held as control.

Starting a timer as the emulsion of chloride was added to the nematode suspension, the organisms were examined by means of a stereoscope-microscope at a magnification of about 10X and the motility estimated and recorded at timed intervals. The following table sets forth the motility of the nematodes as compared to the control culture:

| Motility After— | Culture Containing the Test Chloride at Percent Concentration | | Control Culture |
|---|---|---|---|
| | 0.1% | 0.01% | |
| 10 minutes | 15 | 80 | 100 |
| 20 minutes | 5 | 50 | 100 |
| 30 minutes | 1 | 50 | 100 |
| 60 minutes | 1 | 25 | 100 |
| 2 hours | 1 | 10 | 100 |
| 24 hours | 0 | 0 | 100 |

Example 11

Testing of the x-dodecyl-x-methylbenzyltris(dimethylamino)phosphonium chloride of Example 9 was conducted according to the procedure described in the above example giving the following values:

| Motility After— | Culture Containing the Test Chloride at Percent Concentration | | Control Culture |
|---|---|---|---|
| | 0.1% | 0.01% | |
| 10 minutes | 20 | 75 | 100 |
| 20 minutes | 10 | 25 | 100 |
| 30 minutes | 5 | 15 | 100 |
| 60 minutes | 2 | 10 | 100 |
| 2 hours | 2 | 5 | 100 |
| 24 hours | 0 | 0 | 100 |

Example 12

Herbicidal spray testing of the benzyltris(dimethylamino)phosphonium chloride of Example 1 was conducted as follows:

A cyclohexanone solution of the compound was prepared and this solution and an emulsifying agent was added to water, the quantity of solution employed being calculated to give respective emulsions containing 0.1% and 0.3% of the chloride based on the weight of the total emulsion. The quantity of emulsifying agent used was 0.2% by weight based on the weight of the total emulsion and the emulsifying agent which was used was "Emulsifier L," (a mixture of a polyalkylene derivative and an alkylbenzenesulfonate). Three-week old corn and bean plants respectively were sprayed with said emulsions, two plants of each variety being employed. The spraying was continued until droplets formed on and/or fell from the foliage and stems of the sprayed plants up to 15 ml. of the emulsions being applied to each plant. The sprayed plants as well as two untreated "blank" specimens of each plant were then allowed to remain under standard conditions of sunlight and watering for a period of one week. At the end of this time, observation of the plants showed that those of the bean plants which had been sprayed with either the 0.1% or the 0.3% emulsion of the chloride were dead and completely defoliated, that corn plants which had been sprayed with the 0.1% emulsion of the chloride were dead with the foliage thereof completely dried, and that corn plants which had been sprayed with the 0.3% emulsion of the chloride were severely injured.

Example 13

A flat containing about two plants each of two-week old wild oats, cheat grass, rye grass, buckwheat, red clover, mustard, beet, cotton and cucumber, and five plants of corn was employed in the herbicidal testing of x - dodecyl - x - methylbenzyltris(dimethylamino)phosphonium chloride, Example 9. A herbicidal spray was prepared by dissolving the chloride in acetone and adding the resulting acetone solution to water in a quantity to make up a 1.0% concentration of said chloride. The flat of plants was sprayed with the resulting solution to run off. The sprayed flat was then placed in the greenhouse under ordinary conditions of sunlight and watering for ten days. Observation of the plants at the end of this time showed that those of the broad-leaf plants which had been sprayed with said solution were completely dead and that the narrow-leaf plants were moderately injured. Plants in a "blank" flat which had been kept in the greenhouse under the same conditions were all thriving.

Example 14

Herbicidal activity of the present compounds was determined by germination of cucumber seeds for 4 days at a temperature of 76° F. in the presence of aqueous suspensions of each of the indicated chemicals at concentrations of 100 p. p. m. Seventy-five seeds were used for each test. The results are expressed as per cent length of the primary roots in the presence of the chemical compared with the length of the primary roots of controls which had been germinated in water.

| Compound tested | Percent Growth at 100 Parts Per Million |
|---|---|
| Benzyltris(dimethylamino)phosphonium chloride | 29 |
| 2-Chlorobenzyltris(dimethylamino)-phosphonium chloride | 13 |
| 4-Chlorobenzyltris(dimethylamino)-phosphonium chloride | 24 |
| 2,4-dichlorobenzyltris(dimethylamino)-phosphonium chloride | 13 |
| 3,4-dichlorobenzyltris(dimethylamino)-phosphonium chloride | 9 |

The herbicidal efficiency of the present products is remarkable, because as shown in the table given below, nitrogenous phosphorus compounds generally do not possess great herbicidal efficiency. When tested as described above, aqueous suspensions of a random group of such compounds were found to have the following effects:

| Compound tested | Percent Growth at 100 Parts Per Million |
|---|---|
| Hexa-n-butylphosphorous triamide | 73 |
| Diethyl N-dimethylamidophosphate | 104 |
| Hexaethylphosphoric triamide | 73 |

This is a continuation-in-part of my copending application, Serial No. 223,449, filed April 27, 1951, now abandoned. The copending application Serial No. 529,314, filed August 18, 1955, relates to the nematocidal use of certain of the present alkylbenzyl(dialkylamino)-phosphonium halides.

What I claim is:
1. Phosphonium halides having the general formula

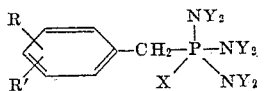

in which R and R' are selected from the class consisting of hydrogen, chlorine, bromine and alkyl radicals of from 1 to 18 carbon atoms, Y is selected from the class consisting of alkyl radicals of from 1 to 4 carbon atoms, and X is selected from the class consisting of chlorine and bromine.

2. Benzyltris(dimethylamino)phosphonium chloride.
3. 2 - chlorobenzyltris(dimethylamino)phosphonium chloride.
4. 3,4 - dichlorobenzyltris(dimethylamino)phosphonium chloride.

References Cited in the file of this patent

UNITED STATES PATENTS

| | | |
|---|---|---|
| 1,990,609 | Meis | Feb. 12, 1935 |
| 2,146,584 | Lipkin | Feb. 7, 1939 |
| 2,160,841 | Dreyfus | June 6, 1939 |

FOREIGN PATENTS

| | | |
|---|---|---|
| 201,549 | Switzerland | Mar. 1, 1939 |

OTHER REFERENCES

Michaelis et al.: "Ber. deut. chem." vol. 28 (1895), pp. 2205–11.

Michaelis: "Liebigs Annalen," vol. 326 (1903), pp. 169–171.

Kosolapoff: "Organophosphorus Compounds" (Wiley and Sons, Inc.), (1950) pp. 326, 327 and 332.